United States Patent [19]

Hartnett et al.

[11] Patent Number: 4,858,295
[45] Date of Patent: Aug. 22, 1989

[54] METHOD OF MAKING A CAMSHAFT FOR RECIPROCATING PISTON ENGINES

[75] Inventors: Michael J. Hartnett, Woodbury; Robert Lugosi, Canton; James Rollins, Winsted; John P. Cook, Simsbury; Jeffrey A. Clark, Riverton, all of Conn.

[73] Assignee: The Torrington Company, Torrington, Conn.

[21] Appl. No.: 167,759

[22] Filed: Mar. 14, 1988

Related U.S. Application Data

[62] Division of Ser. No. 819,837, Jan. 17, 1986, Pat. No. 4,781,076.

[51] Int. Cl.4 .................. B23P 15/00; B23P 11/02; B21D 39/00
[52] U.S. Cl. .................. 29/156.4 R; 29/523
[58] Field of Search ............. 29/156.4 R, 523; 74/567

[56] References Cited

U.S. PATENT DOCUMENTS

| 2,465,144 | 3/1949 | Wyatt | 29/523 UX |
| 4,293,995 | 10/1981 | Jordan | 29/523 X |
| 4,597,365 | 7/1986 | Madaffer | 29/156.4 R X |

FOREIGN PATENT DOCUMENTS

| 9034 | 1/1981 | Japan | 29/523 |
| 149655 | 9/1982 | Japan | 74/567 |
| 850058 | 9/1960 | United Kingdom | 29/523 |
| 1117816 | 6/1968 | United Kingdom | 74/567 |

*Primary Examiner*—Charlie T. Moon
*Attorney, Agent, or Firm*—Frank S. Troidl

[57] ABSTRACT

Axially spaced cams and bearing rings mounted on a tube are permanently secured to the tube by circumferentially spaced projections on the tube extending into grooves formed on the inside surfaces of the cams and bearing rings.

1 Claim, 1 Drawing Sheet

METHOD OF MAKING A CAMSHAFT FOR RECIPROCATING PISTON ENGINES

This is a division of application Ser. No. 819,837 filed Jan. 17, 1986, now U.S. Pat. No. 4,781,076.

This invention relates to camshafts for reciprocating piston engines. More particularly, this invention is a new camshaft and a new method of making a camshaft in which bearings, cams and the like are produced as individual parts and are fastened to the shaft.

The U.S. Pat. No. 4,382,390, issued May 10, 1983, to Friedrich Jordan and entitled, "Camshaft for Reciprocal Piston Engines", shows a camshaft in which bearings, cams, and the like are produced as individual parts and are fastened to the tube. In the Jordan camshaft, a tube is expanded by hydraulic or rubber means to conform the outside wall of the tube with the inside surface geometry of the cams and bearing rings. However, a big disadvantage in making the Jordan camshaft is that the wall and the axis of the tube inside the cams is completely offset from the wall and the axis of the rest of the tube. Thus, it is necessary that the cams be inserted into a die which corresponds to their outer shape in order to be sure that the widening of the hollow shaft will not cause substantial deformation of the cams.

The camshaft for a reciprocating piston engine and the method of making such a camshaft of this invention does not require that portions of the tube wall be completely offset to an axis different from the axis of the rest of the tube. Therefore, the forces necessary to interlock the cams and bearing rings with the tube are far less than the forces required by Jordan and usually the specially formed die required by Jordan is unnecessary.

Other current methods for making camshafts in which bearings, cams, and the like are produced as individual parts and fastened to a tube include uniformly expanding a tube to interlock with axial splines in the cam inside diameter. A uniform internal pressure is applied to expand the tube to uniformly match the outside diameter of the tube with the inside diameter of the cam. At this pressure, the cam is not yet stressed and no tube material has flown into the splines. In order for material to flow into the splines, the internal pressure in the tube must be increased. At the higher pressure, as the tube material flows into the splines, the cylindrical inside diameter portion of the cam is stressed. The resulting tensile stresses in the cam inside diameter tend to cause cracks if the cam is not in the soft state of heat treatment. Even if the cam is in the soft state, the stress situation is undesirable and is typically countered by the application of external pressure on the cam equivalent to that of the internal stresses. To apply the external stressing, some means of pressurization is set-up, such as a die or hydraulic system which always increases costs.

The camshaft for a reciprocating piston engine and the method of making such a camshaft of this invention require much smaller total energy (forces). The stressing of the inside diameters of the cams and bearings is essentially eliminated. Thus, fully hardened cams and bearings can be readily attached to the tube at very low cost.

Briefly described, the camshaft comprises a rotatable tube having a plurality of circumferentially spaced axially extending projections on its outside surface. The projections are formed by expanding portions of the wall of the tube away from the axis of the tube. Axially spaced cams and bearing rings are mounted about the tube. Each cam and each bearing ring has circumferentially spaced, axially extending grooves on their inner surfaces The projections of the tube extend into grooves of the cams and bearing rings to permanently secure the cams and bearing rings on the tube.

Briefly described, the new method of making a camshaft comprises axially spacing and placing the cams and bearing rings on the rotatable tube. Each cam and each bearing ring has circumferentially spaced, axially extending grooves on their inner surfaces. Portions of the wall of the tube are expanded away from the tube axis and into the grooves on the inner surfaces of the cams and bearing rings.

The invention, as well as its many advantages, may be further understood by reference to the following detailed description and drawings in which.

In the various figures, like parts are referred to by like numbers.

Figure 1:
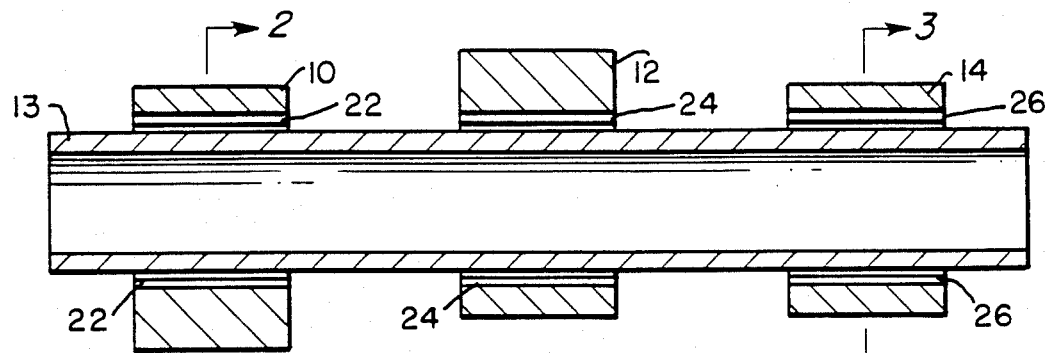
FIG. 1 is a longitudinal section showing the axially spaced cams and bearing ring slipped over the tube.
Figures 2, 3:
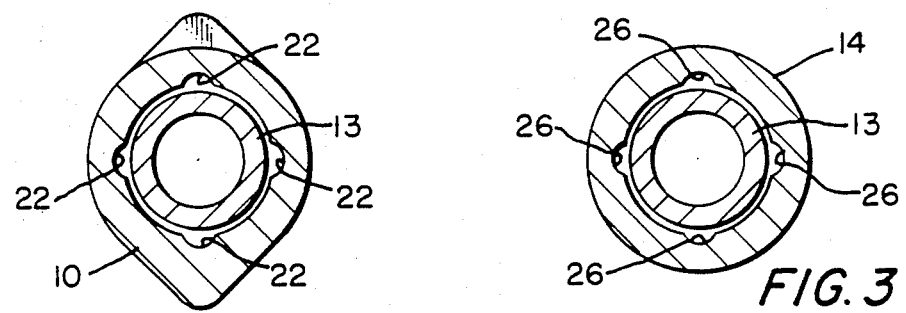
FIG. 2 is a sectional view taken along lines 2—2 of FIG. 1 and in the direction of the arrows.
FIG. 3 is a sectional view taken along lines 3—3 of FIG. 1 and in the direction of the arrows.

Referring to the drawings and more particularly to FIG. 1, the manufacture of the camshaft is accomplished by slipping the cams 10 and 12 and bearing rings 14 (only one bearing ring shown) over the tube 13 at the desired location. The cams and bearing rings are axially spaced from one another and held in position in their desired axial and radial positions.

The inside surfaces of each cam and the inside surface of the bearing ring have inside diameters sufficiently larger than the outside diameter of the tube 13 to provide a tube-to-cam clearance and a tube-to-bearing ring clearance ranging from 0.001 inches to 0.010 inches. Thus the cams and the bearing ring may be easily slip fit over the tube.

The inside surface of cam 10 and the inside surface of cam 12 have circumferentially spaced grooves 22 and 24, respectively, axially extending completely through the cams 10 and 12. Similarly, the inside surface of the bearing ring 14 has circumferentially spaced grooves 26 axially extending completely through the bearing ring 14.

To permanently secure the cams and bearing ring on the tube, portions of the wall of the tube are expanded away from the tube axis and into the grooves on the inside surfaces of the cams and bearing ring. In the embodiment shown in FIGS. 4 through 6, the portions of the tube are mechanically expanded.

Figure 4:
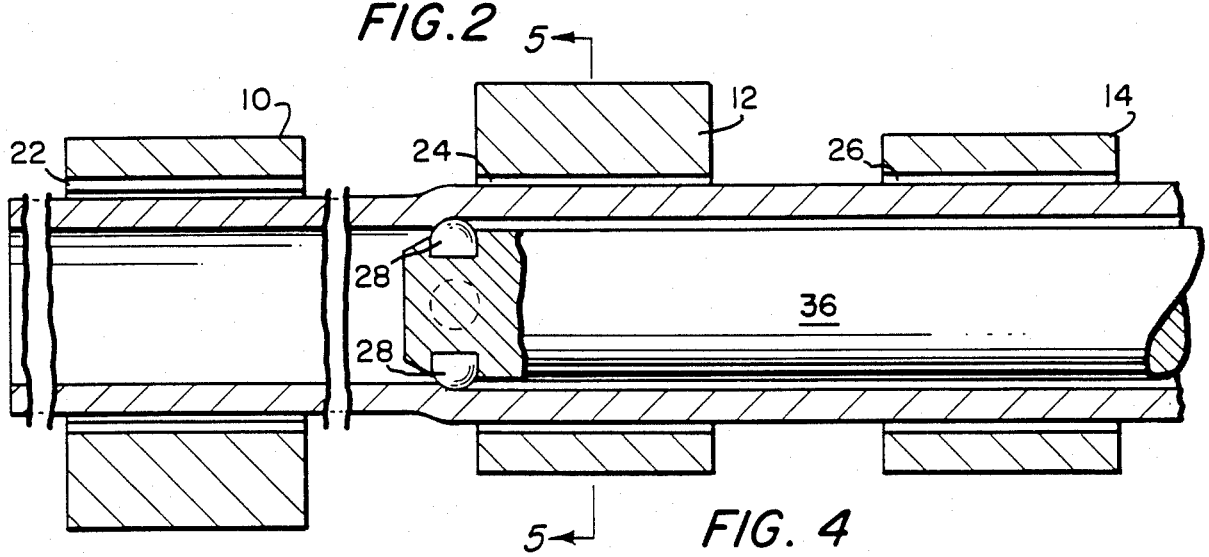
FIG. 4 is a longitudinal section through the camshaft showing the parts after an expander tool has moved partially through the tube to displace longitudinal portions of the tube.

As shown in FIG. 4 an expander tool 36 is shown after it has been moved partially through the tube 13. The expander tube 36 has been moved axially through the bearing ring 14 and the cam 12. Of course, to completely make the camshaft, the operation will be completed after the expander tool 36 has moved through the cam 10. A plurality of circumferentially separated semi-spherically shaped hard material protrusions 28 are embedded in the expander tool 36 adjacent one end of the expander tool 36. The effective diameter of the protrusions 28 is sufficiently larger than the inside diameter of the tube 13 to cause the protrusions to expand portions of the tube 13 into the cam grooves and bearing ring grooves to permanently secure the cams and bearing ring on the tube.

Figures 5, 6:
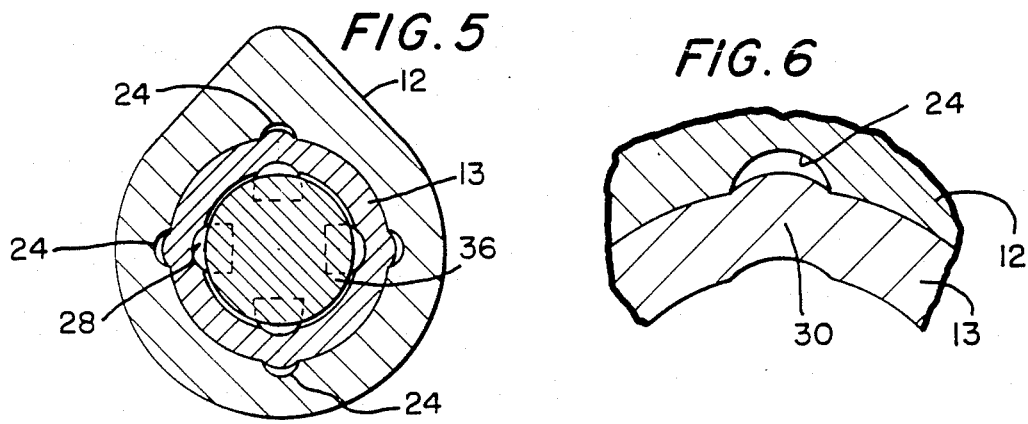
FIG. 5 is a view taken along lines 5—5 of FIG. 4 and in the direction of the arrows.
FIG. 6 is a sectional view, on an enlarged scale, showing the interlocking arrangement of a tube projection into the groove of the cam.

As shown in FIG. 5, the semi-spherical hard material protrusions 28 are positioned so that as the protrusions move within the tube past the cam or bearing the hard material protrusions 28 will expand the softer tube material into the grooves. As a result of the expansion, the entire circumference of the tube 13 is moved outwardly. Because of the slight difference between the initial diameter of the tube 13 and the inside surfaces of the cams and bearing ring, the outside surface of the tube presses tightly against the inside surfaces of the cams and bearing ring.

The completed camshaft for reciprocating piston engines will include the rotatable tube 13 with the plurality of circumferentially spaced axially extending projections 30 (see FIG. 6) on its outside surface. The projections are, of course, formed by expanding portions of the wall of the tube away from the axis of the tube. Note that all of those portions of the wall which are displaced are expanded away from the axis of the tube so that there is no offset or displacement of the tube wall. That is, the axis of the cams and the axis of the bearing ring are the same as the axis of the remainder of the tube 13. This is in sharp contrast to the camshaft shown in the U.S. Pat. No. 4,382,390 issued May 10, 1983 to Friedrich Jordan and entitled, "Camshaft For Reciprocal Piston Engines". The projections of the tube extend into the grooves of the cams and bearing to permanently secure the cams and bearing ring on the tube.

As a specific example, the tube 13 may range from 1 inch to 1¼ inches outside diameter with a wall thickness ranging from 0.125 inches to 0.150 inches, depending on the intended use of the camshaft. For example, camshafts for automotive and diesels would be larger than for other purposes. The tube-to-cam clearance and the tube-to-bearing ring clearance cams and the grooves in the bearing ring may be approximately 0.020 inches deep with a radius ranging from ⅛ inch to ¼ inch. The expander tool 36 would have an outside diameter of about 0.020 inches less than the inside diameter of the tube 13 with the protrusions 28 having an effective outside diameter approximately 0.080 inches larger than the inside diameter of the tube 13.

The tube 13 is preferably made of formable steel having a maximum hardness of R 40. The cams are preferably made of steel which is hardenable to a minimum hardness of R 58. Powder forged AISI 4660 series material have also been successfully used as cams. The bearing rings are preferably steels or iron compatible with the bushings. Also, powdered metal rings have been used having an apparent hardness of $R_B 90$.

We claim:

1. A method of making a camshaft having cams and bearing rings on a rotatable tube comprising the steps of: axially spacing and placing the cams and bearing rings about the rotatable tube, each cam and each bearing ring having a cylindrical inside surface with circumferentially spaced apart axially extending grooves on said inside surfaces; axially aligning said grooves in said cam and said bearing rings on said tube; and expanding circumferentially spaced apart portions of the wall of the tube away from the tube axis and into the grooves on the inside surfaces of the cams and bearing rings by axially inserting an expander tool having circumferentially separated hard material protrusions constructed to expand portions of the wall of said tube away from the tube axis, into the tube, each of said protrusions being positioned in axial alignment with each of said grooves so that as the protrusions move within the tube past the cams and bearing rings the hard material protrusions expand said portions of the wall into the grooves on the inside surfaces of the cams and bearing rings.

* * * * *